(12) United States Patent
Patwari et al.

(10) Patent No.: US 8,503,673 B2
(45) Date of Patent: Aug. 6, 2013

(54) METHOD AND SYSTEM FOR SECRET KEY EXCHANGE USING WIRELESS LINK CHARACTERISTICS AND RANDOM DEVICE MOVEMENT

(75) Inventors: Neal Patwari, Salt Lake City, UT (US); Jessica Erin Croft, Salt Lake City, UT (US); Suman Jana, Austin, TX (US); Sneha Kasera, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 27 days.

(21) Appl. No.: 13/063,659

(22) PCT Filed: Sep. 11, 2009

(86) PCT No.: PCT/US2009/056718
§ 371 (c)(1),
(2), (4) Date: Jul. 22, 2011

(87) PCT Pub. No.: WO2010/030927
PCT Pub. Date: Mar. 18, 2010

(65) Prior Publication Data
US 2011/0280397 A1 Nov. 17, 2011

Related U.S. Application Data

(60) Provisional application No. 61/096,265, filed on Sep. 11, 2008.

(51) Int. Cl.
*H04L 9/00* (2006.01)
(52) U.S. Cl.
USPC .......................................................... 380/44

(58) Field of Classification Search
USPC ............................................................ 380/44
See application file for complete search history.

(56) References Cited

U.S. PATENT DOCUMENTS

| | | | |
|---|---|---|---|
| 5,604,806 A | 2/1997 | Hassan | |
| 6,301,324 B1 | 10/2001 | Pearson | |
| 6,553,120 B1 | 4/2003 | Vaudenay | |
| 6,744,253 B2 | 6/2004 | Stolarczyk | |
| 7,064,660 B2 | 6/2006 | Perkins | |
| 7,075,424 B1 | 7/2006 | Sundaresan | |
| 7,307,575 B2 | 12/2007 | Zemany | |
| 7,317,419 B2 | 1/2008 | Sugar | |
| 7,570,063 B2 | 8/2009 | Van Veen | |
| 7,890,060 B2 | 2/2011 | Lehtinen | |

(Continued)

FOREIGN PATENT DOCUMENTS

| | | |
|---|---|---|
| WO | WO2009033001 | 3/2009 |
| WO | WO2010030956 | 3/2010 |

OTHER PUBLICATIONS

Mathur et al., "Radio-telepathy: Extracting a Secret Key from an Unauthenticated Wireless Channel", Sep. 2008, ACM, pp. 128-139.*

(Continued)

*Primary Examiner* — Matthew Smithers
(74) *Attorney, Agent, or Firm* — Workman Nydegger (57) ABSTRACT

A new methodology to exchange a random secret key between two parties. The diverse physical characteristics of the wireless medium and device mobility are exploited for secure key exchange. Unique physical characteristics of wireless channels between the two devices are measured at different random locations. A function of these unique characteristics determines the shared secret key between the two devices.

17 Claims, 3 Drawing Sheets

U.S. PATENT DOCUMENTS

| | | | |
|---|---|---|---|
| 8,280,046 B2 * | 10/2012 | Rudolf et al. | 380/44 |
| 2002/0168943 A1 | 11/2002 | Callaway | |
| 2003/0117985 A1 | 6/2003 | Fujii | |
| 2003/0214410 A1 | 11/2003 | Johnson | |
| 2004/0170280 A1 | 9/2004 | Fekri | |
| 2005/0195109 A1 | 9/2005 | Davi | |
| 2005/0258988 A1 | 11/2005 | Jiang | |
| 2005/0285792 A1 | 12/2005 | Sugar | |
| 2006/0193284 A1 | 8/2006 | Stieglitz | |
| 2007/0026935 A1 | 2/2007 | Wolf | |
| 2007/0035437 A1 | 2/2007 | Steinway | |
| 2007/0036353 A1 * | 2/2007 | Reznik et al. | 380/30 |
| 2007/0060098 A1 | 3/2007 | McCoy | |
| 2007/0086489 A1 | 4/2007 | Carlson | |
| 2007/0165845 A1 | 7/2007 | Ye et al. | |
| 2007/0177729 A1 | 8/2007 | Reznik et al. | |
| 2008/0090572 A1 | 4/2008 | Cha et al. | |
| 2008/0123851 A1 * | 5/2008 | Guccione et al. | 380/270 |
| 2008/0169961 A1 | 7/2008 | Steinway | |
| 2008/0244094 A1 | 10/2008 | Rich | |
| 2009/0040952 A1 | 2/2009 | Cover | |
| 2009/0052663 A1 * | 2/2009 | Hammond et al. | 380/44 |
| 2009/0141900 A1 * | 6/2009 | Ye et al. | 380/270 |
| 2009/0161127 A1 | 6/2009 | Schweid | |
| 2010/0067701 A1 | 3/2010 | Patwari | |
| 2010/0207732 A1 | 8/2010 | Patwari | |
| 2011/0222421 A1 | 9/2011 | Jana | |
| 2011/0273321 A1 | 11/2011 | Joshi | |
| 2012/0009882 A1 | 1/2012 | Patwari | |
| 2013/0003077 A1 | 1/2013 | Suehira | |

OTHER PUBLICATIONS

International Search Report for PCT/2009/056718, mailed Aug. 26, 2010.
Written Opinion of the International Searching Authority for PCT/2009/056718, mailed Aug. 26, 2010.
Zang Li, Wenyuan Xu, Rob miller, Wade Trappe, Securing Wireless Systems via Lower Layer Enforcements, Sep. 29, 2006, pp. 33-41.
U.S. Appl. No. 12/558,106, filed Jan. 23, 2012, Office Action.
U.S. Appl. No. 12/558,106, filed Sep. 6, 2012, Notice of Allowance.
U.S. Appl. No. 12/558,106, filed Dec. 12, 2012, Notice of Allowance.
International Search Report for PCT/US2009/056751, mailed Apr. 15, 2010.
Written Opinion for PCT/US2009/056751, mailed Apr. 15, 2010.
Tadayoshi, Kohno et al., "Remote Physical Device Fingerprinting" *IEEE*, Apr. 2005, pp. 93-108.
Liran, Ma et al, "A Hybride Rogue Access Point Protection Framework . . . " *IEEE*, Apr. 2008, pp. 1894-1902.
International Search Report for PCT/US2009/056743, mailed Apr. 26, 2010.
Written Opinion for PCT/US2009/056743, mailed Apr. 26, 2010.
International Search Report for PCT/US2008/075369, mailed Apr. 8, 2009.
Written Opinion for PCT/US2008/075369, mailed Apr. 8, 2009.
U.S. Appl. No. 13/063,646, filed Feb. 22, 2013, Notice of Allowance.
U.S. Appl. No. 13/178,295, filed Mar. 20, 2013, Office Action.
U.S. Appl. No. 13/063,687, Mailed Apr. 15, 2013, Office Action.
U.S. Appl. No. 13/063,646, Mailed Apr. 5, 2013, Notice of Allowance.

* cited by examiner

METHOD AND SYSTEM FOR SECRET KEY EXCHANGE USING WIRELESS LINK CHARACTERISTICS AND RANDOM DEVICE MOVEMENT

CROSS REFERENCE TO RELATED APPLICATIONS

This present application is filed under and pursuant to 35 U.S.C. 371 and claims the priority and benefit of PCT/US2009/056718 filed Sep. 11, 2009, which in turn claims priority to and the benefit of U.S. Provisional Application No. 61/096,265, entitled "Method and System for Secret Key Exchange Using Wireless Link Characteristics and Random Device Movement," filed on Sep. 11, 2008, the disclosures of each being fully incorporated herein.

NOTICE OF FEDERAL FUNDING

This invention was made with government support under W911NF-07-1-0318 awarded by Office of Naval Research. The Government has certain rights to this invention.

BACKGROUND OF THE INVENTION

1. Field of Invention

The present invention relates to the field of wireless networks. Specifically, the present invention relates to secret key exchange using temporal link signatures and device mobility.

2. The Relevant Technology

Secret key establishment between two entities is a fundamental requirement for private communication between these entities. Currently, the most common method for establishing a secret key is by using public key cryptography. However, public key cryptography consumes significant amount of computing resources and power which might not be available in certain scenarios (e.g., sensor networks).

One of the important concerns with public key cryptography is that its security depends on factorization of large numbers. Researchers have argued that powerful future computers, for example quantum computers, when available, will be able to factorize large numbers quickly.

In addition, a public key infrastructure (PKI) requires the cumbersome use of a third party authentication service to verify the validity of a public or private key. Specifically, the PKI requires the use of a digital certification for document and identity authentication purposes. In general, such digital certificates are used to certify the identity of an entity in the digital world. A certificate authority (CA) is a trusted entity that issues, renews, and revokes certificates. Reference back to the CA is necessary to ensure that the public/private key combination is still valid.

What is necessary are techniques that do not use public key cryptography for next generation networks.

SUMMARY OF THE INVENTION

Accordingly, what is needed is secret key generation that does not require a public key. What is described is a new methodology to exchange a random secret key between two parties. The diverse physical characteristics of the wireless medium and device mobility are exploited for secure key exchange. Unique physical characteristics of wireless channels between the two devices are measured at different random locations. A function of these unique characteristics determines the shared secret key between the two devices.

Specifically, the time variation of the received signal strength (RSS) is measured and used as a characteristic of the radio channel between two devices. This information also provides the source of secret information shared between a transmitter and receiver. In addition, information reconciliation and privacy amplification techniques are performed for improving performance of the secret key generation and to achieve a faster rate of key generation.

In one embodiment, a method for secret key exchange is described. The method includes exchanging transmissions between a first device and a second device over at least one channel. A random movement is introduced and initiated at the first device. The random movement is initiated and performed while exchanging the transmissions. A first signal is received at the first device from the second device, while exchanging the transmissions and during execution of the random movement. A first impulse response of the first signal that is received is determined. The first impulse response is quantized to generate a first secret key.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Reference will now be made in detail to the preferred embodiments of the present invention, a method and system for generating a digital secret that is shared between two wireless devices. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention provide for the generation of a shared digital secret that is based a physical layer characteristic of the radio channel between a transmitter and a receiver, that comprises a temporal link signature. The temporal link signature is the sum of the effects of the multiple paths from the transmitter to the receiver, each with its own time delay, phase, and complex amplitude. Such a signature changes when the transmitter or receiver changes position because the multiple paths in the link change with the positions of the endpoints of the radio link. Embodiments of the present invention are capable of generating the shared digital secret using the temporal link signature.

Overview

The present invention provides a unique solution to the problem of sharing secret keys between wireless devices. For instance, the inherent randomness in the wireless channel between two wireless devices (e.g., device A for user Alice and device B for user Bob) as a source for extracting bits of the secret key between these devices.

Figure 1:
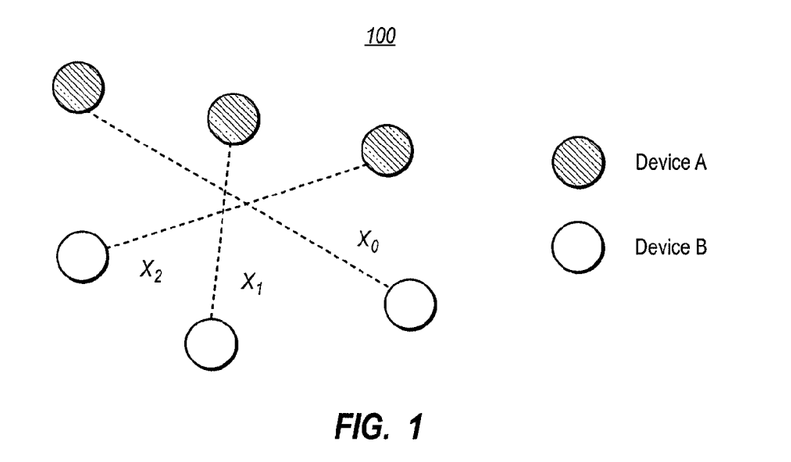
FIG. 1 is an illustration of two wireless devices in communication for purposes of generating a shared digital secret, in accordance with one embodiment of the present invention.

FIG. 1 is an illustration of two wireless devices within range of each other. The present invention provides for the generation of a sufficiently long secret. The length of the secret is dependent on the prevention of brute force attacks. Two devices A and B are shown in FIG. 1. Devices A and B are mobile and can be at different locations at different times. For instance, both device A and device B are each shown in three different locations. Let Xi be some physical characteristic of the link between A and B, at a time when A and B are at some specific location. Let Xi be measured accurately only by devices A and B and no other device that is not at the location of A or B. The present invention provides a suitable physical characteristic Xi and a function $f$ such that the shared secret between A and B is $f(X_1, X_2, X_3, \ldots X_n)$. It is not be computationally feasible for another device that can overhear the communication between A and B to discover this secret.

Central to the secret bit extraction are three properties of transmission and reception of radio signals, in embodiments of the present invention. Essentially, the radio channel is a time and space-varying filter, such that at any point in time has the identical filter response for signals sent from Alice to Bob as for signals sent from Bob to Alice.

The first property describes the reciprocity of the wireless radio channel. Specifically, the multipath properties of the radio channel (gains, phase shifts, and delays) at any point in time are identical on both directions of a link. The second property describes the temporal variations in the radio channel. Specifically, over time, the multipath channel changes due to movement of either end of the link, and any motion of people and objects in the environment near the link. In one embodiment, to introduce added security, a device may be moved or shaken (e.g., by a user) in order to generate more temporal variation. The third property describes spatial variations. That is, the properties of the radio channel are unique to the locations of the two endpoints of the link. An eavesdropper at a third location more than a few wavelengths from either endpoint will measure a different, uncorrelated radio channel.

More specifically, the temporal variations in the received signal strength (RSS) measurements at Alice and Bob are used to extract secret bits and derive a shared key. The time-variation of the RSS is measured and used as the statistic of the radio channel and the source of secret information shared between a transmitter and a receiver. The variation over time of the RSS is caused by motion and multipath fading.

In addition, the mean RSS value, a somewhat predictable function of path length, is filtered out of the measured RSS signal and does not appear in the secret bits. These RSS temporal variations, as measured by Alice and Bob, cannot be measured by an adversary eavesdropper (say Eve) from another location unless Eve is physically very close to Alice or Bob.

Figure 2:
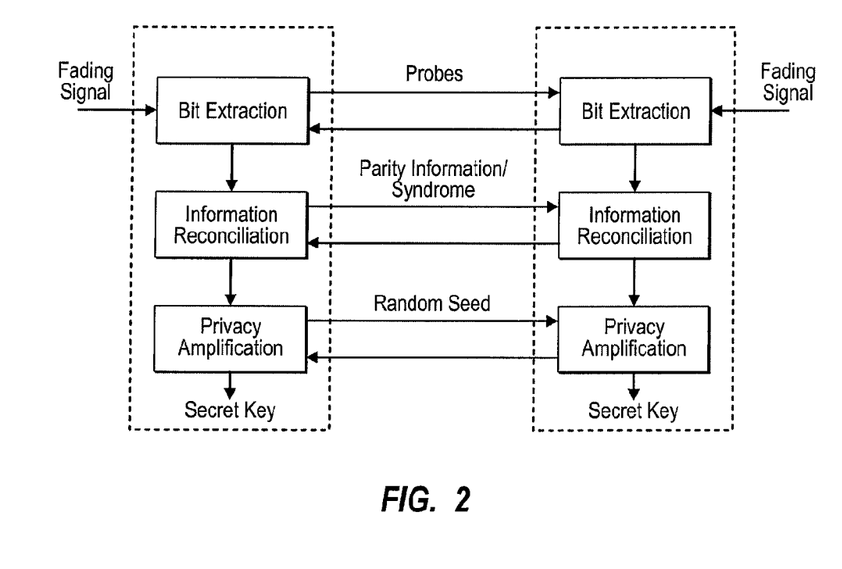
FIG. 2 is a block diagram illustrating two wireless devices with components used for purposes of generating a shared digital secret, in accordance with one embodiment of the present invention.

FIG. 2 is a block diagram of the devices A and B of FIG. 1, in accordance with one embodiment of the present invention. In particular, FIG. 2 shows the components of devices A and B that are used to produce the final secret key. For instance, each of the devices include a bit extraction module, an information reconciliation module, and a privacy amplification module. At both ends, substantially identical secret keys are generated.

A bit extraction module is capable of filtering and quantizing the received signal at both ends of the channel (e.g., devices A and B).

The information reconciliation module addresses the situation where the radio channel between devices A and B includes non-reciprocal elements. That is, due to non-ideal conditions, including limited capabilities of the wireless hardware, Alice and Bob are unable to obtain identical measurements of the channel. This asymmetry in measurements brings up the challenge of how to make Alice and Bob agree upon the same bits without giving out too much information on the channel that can be used by Eve to recreate secret bits between Alice and Bob, as will be discussed below. To solve the asymmetry problem while minimizing the information leakage, a quantum cryptography technique involving information reconciliation is adapted to the wireless domain.

The privacy amplification module addresses the concern that the bits Alice and Bob extract from the measurements of the radio channel are not totally random due to the short-term correlation between bits. That is, the radio channel changes slowly over time. This happens when the motion of the wireless devices and that of the objects in the environment is slow. As such, if the channel measurements are used directly to create the secret key, the measurement bits are likely to be repeated. Stated in another way, the entropy of the extracted bit stream is less than 1. If not handled adequately, the correlation between bits can enable Eve to guess certain bits of the derived key with high probability if she is able to guess one bit correctly. To solve this problem, a quantum cryptographic method called privacy amplification is employed to reduce the amount of information the attacker can have about the derived key. This is achieved by letting both Alice and Bob use universal hash functions, chosen at random from a publicly known set of such functions, to transform the reconciled bit stream into a nearly perfect random bit stream. This nearly perfect random bit stream is then used as the secret key between Alice and Bob. As an additional advantage, privacy amplification also minimizes the impact of the information leaked during information reconciliation.

The present invention for generating secret keys in a wireless environment is universally applicable to a wide variety of wireless networks and capable of simultaneously achieving a high secret bit rate and nearly perfect random secret bit stream. In one embodiment, to keep the secret bit generation rate high, a motion of the wireless device is introduced. In addition, novel applications of information theoretic methods developed for quantum cryptography are applied to secret key generation from wireless channel measurements.

Adversary Model

An adversary Eve is considered that can overhear all communication between the Alice and Bob. The adversary can also be in some locations where the transmitter or receiver associated with Alice and Bob have been in the past, or will be in the future. In addition, Eve can also measure both the channels between herself and Alice and Bob at the same time when Alice and Bob measure the channel between them for key extraction. An assumption can be made that Eve knows the key extraction algorithm and the values of the parameters used in the algorithm.

Physical Characteristics Between Nodes and Temporal Link Signature

A physical layer characteristic of the radio channel between a transmitter and a receiver can be identified as a temporal link signature. The temporal link signature is the sum of the effects of the multiple paths over which radio waves propagate on a link from the transmitter to the receiver, each with its own time delay and complex amplitude. The power of the temporal link signature comes from the variability in the multiple paths over which radio waves propagate on a link. A single radio link is composed of many paths from the transmitter to the receiver. These multiple paths (multipath) are caused by the reflections, diffractions, and scattering of the radio waves interacting with the physical environment. Each path has a different length, so a wave propagating along that path takes a different amount of time to arrive at the receiver. Each path has attenuation caused by path losses and interactions with objects in the environment, so each wave undergoes a different attenuation and phase shift. At the receiver, many copies of the transmitted signal arrive, but each copy arriving at a different time delay, and with a different amplitude and phase. The sum of these time delayed, scaled, and phase shifted transmitted signals is the received signal. The temporal link signature of a radio channel is essentially its channel impulse response.

For the channel between transmitter A and receiver B, the channel impulse response (CIR), denoted $h_{A,B}(t)$, as shown in Eqn. 1.

$$h_{A,B}(\tau) = \sum_{l=1}^{L} \alpha_l e^{j\phi_l} \delta(\tau - \tau_l), \quad (1)$$

In Eqn. 1, $\alpha_l$ and $\phi_l$ are the amplitude and phase of the lth multipath component, $\tau_l$ is its time delay, L is the total number of multipath, and $\delta(\tau)$ is the Dirac delta function. Essentially, the filter impulse response is the superposition of many impulses, each one representing a single path in the multiple paths of a link. Each impulse is delayed by the path delay, and multiplied by the amplitude and phase of that path. Now, $h_{A,B}(\tau)$ can be estimated from the samples of the signal received at the receiver B. This sample estimate of $h_{A,B}(\tau)$ represents the temporal link signature. In addition, the estimate can be normalized with respect to the signal amplitude to obtain an amplitude-normalized link signature. As such, the received power is not necessarily a function of the channel, since because the transmit power can be easily changed.

Non-Reciprocal Measurements

Figure 3:
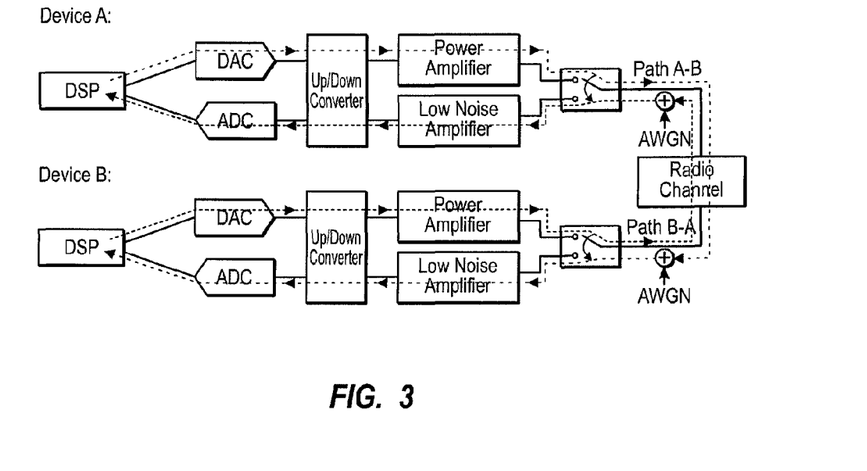
FIG. 3 is an illustration of non-reciprocal measurements between two wireless devices, in accordance with one embodiment of the present invention.

FIG. 3 is an illustration of the hardware components included within the two wireless devices of FIG. 1, in accordance with one embodiment of the present invention. Specifically, the signal received at both ends of the channel between devices A and B include non-reciprocal elements. That is, compared to the signal in path B to A, the signal in path A to B passes through the same reciprocal radio channel, but a different DAC, ADC, low noise amplifier, and power amplifier. The additive noise in each direction is independent.

Reciprocity is a basic property of electromagnetic channels. However, any channel measurements also contain some non-reciprocal elements. The non-reciprocal elements of channel measurements are caused both by additive noise and interference. In addition, the radio channel between devices A and B is measured with real-world hardware components, which have limited capabilities and manufacturing variations.

For instance, ideally, both nodes would measure the channel at precisely the same time, but typical commercial transceivers are half-duplex, i.e., each node can operate their transmitter or receiver, but not both simultaneously. Thus, nodes must measure the radio channel in one direction at a time. However, as long as the time between two directional channel measurements is much smaller than the rate of change of the channel, the half-duplex limitation is not severe.

The other element of non-reciprocity involves the hardware used in each direction of the link. Shown in FIG. 3 is the path of the signal through the hardware of each of the nodes during measurement of the channel in both directions. In direction A-B, the signal path is through the digital-analog converter (DAC), power amplifier (PA) on device A, and the low noise amplifier (LNA) and analog-digital converter (ADC) on device B. However, in direction B-A, these components are the ones on the opposite device. Even if the two transceivers were manufactured at the same fabrication plant, there will be manufacturing variations in the responses of these components. For example, the frequency response and gain of the PA will vary from device to device. These variations introduce non-linearities into the radio channel measurements, even though the radio channel itself is reciprocal.

Bit Extraction

Figure 4:
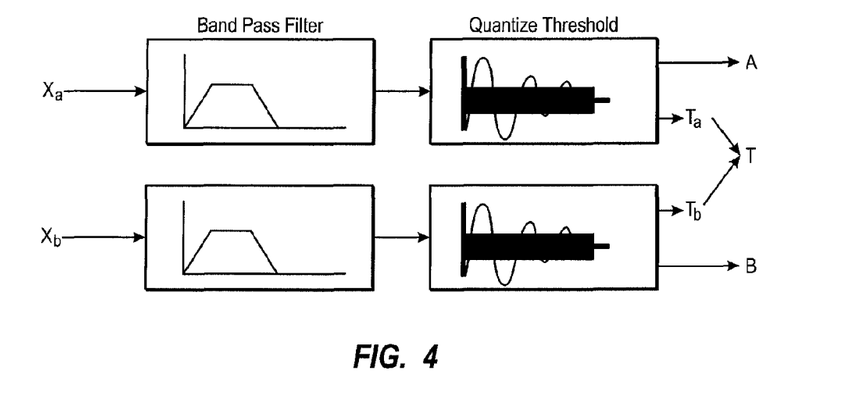
FIG. 4 is an illustration of the process used for bit extraction, in accordance with one embodiment of the present invention.

FIG. 4 is an illustration of the process used for bit extraction, in accordance with one embodiment of the present invention. The radio channel between devices A and B is both a reciprocal and a time-varying filter. Like any filter, the radio channel filter can be described by various statistics. As such, the measured channel gain is a statistic of the radio channel.

To facilitate the key extraction process, the devices associated with Alice and Bob send probe packets to each other. When a device receives a packet, it records its measured received signal strength (RSS). As multiple packets are exchanged between Alice and Bob, each device builds a time series of the measured RSS. Let $r_{a,i}$ be the RSS measured at node a at time i. The bit extraction methodology filters and quantizes this RSS time series, as shown in FIG. 4.

Specifically, the filter has two requirements: (i) it should reduce measurement noise; and (ii) it should remove the mean gain, which is often a strong function of the device characteristics. A low pass filter (LPF) is used to remove noise and subtract the windowed mean to remove the long-term average gain. In addition, each node for devices A and B quantizes the time series, denoted $\{x_{a,i}\}$, to generate its initial bit secret key.

The filter characteristics are described in detail below. A vector $x_a$ is formed, such that $x_a = [x_{a,1}, \ldots, x_{a,N}]^T$. In this vector, for each i, $x_{a,i}$ is classified as being above, below or within a threshold region, $[-\gamma, \gamma]$. Those above $\gamma$ are encoded as 1s and those below $\gamma$ are encoded as 0s, in one embodiment. Of course the encoding could use the opposite values, in another embodiment. The indices of the vector with values that fall within the threshold region should not be encoded. Specifically, node a forms the set $T_a = \{i: -\gamma \leq x_{a,i} \leq {}^a\gamma\}$ and transmits the list of the elements in $T_a$ to node b. Node b similarly forms $T_a$ and transmits it to node a. The union of both sets, $T = T_a \cup T_b$, are the indices not used in the generated secret. Let $\overline{T} = \{1, \ldots, N\} \dagger \tau$ be the indices that will be used in the secret, and let $t_j \in \{1, \ldots, |\overline{T}|\}$ be the jth element of $\overline{T}$. Then, the secret bit vector of node a is given by $A = [A_1, \ldots, A_n]^T$, where $n = |\overline{T}|$, and $$A_j = \begin{cases} 1, & x_{a,t_j} > \gamma \\ 0, & x_{a,t_j} < -\gamma \end{cases} \quad (2)$$

Similarly, vector B is formed at node b using the data $\{x_{b,t_j}\}$ for $t_j \in \overline{T}$.

Information Reconciliation

Once both devices A and B associated with Alice and Bob extract the bit stream from their channel measurements using the above methodology, to agree upon the same key, they must correct the bits where the two bit streams differ. The differences in the two bit streams arise due to the non-reciprocal elements described earlier. The asymmetry in the bit streams brings up the challenge of how to make the devices A and B agree upon the same bits without giving out too much information on the channel that can be used by Eve to recreate secret bits between devices A and B.

Towards the development of an efficient methodology for aligning the two bit streams at devices A and B, an estimate is needed to determining the information theoretic limit for the minimum amount of information publicly transmitted in order to correct all the errors. Let $\{p(x)\}_{x \in S_X}$ be a probability distribution of a discrete random variable X over a finite set $S_X$. The entropy of X, denoted by H(X), is defined as follows in Eqn. 3.

$$H(X) = \sum_{x \in S_X} p(x) \log(p(x)) \quad (3)$$

All logarithms are base 2 unless stated otherwise. H(X) is the theoretical limit on the minimum number of bits needed to specify the value of the random variable X. It is assumed that devices A and B both have two bit streams A and B of length n. Then, define $P_i$ to be the 'disagreement' function, as provided in Eqn 4.

$$P_i = \begin{cases} 1, & A_i = B_i \\ 0, & A_i \neq B_i \end{cases} \quad (4)$$

The value of $P_i$ indicates an disagreement on bit i between devices A and B. Define $p=P[P_i=0]$ to be the probability of this bit disagreement. The per bit entropy H(P) of the information which device A associated with Alice needs to send to device B for bit correction is provided in Eqn. 5.

$$H(P) = -p \log(p) - (1-p)\log(1-p) \quad (5)$$

Since devices A and B need to fix bit streams of length n, the minimum amount of information which is needed to be revealed during information reconciliation is provided in Eqn. 6.

$$nH(P) = -np \log(p) - n(1-p)\log(1-p) \quad (6)$$

Note that the above analysis assumes that samples of $P_i$ are independent. In reality, the random process $\{P_i\}$ will have correlation between samples, as will be explored in the description regarding privacy amplification.

The problem of correcting Alice's and Bob's bit streams whose value differ in some bits is very similar to the error correction coding problem in information theory. Therefore, use of different error correcting codes can be used to solve this problem. Let $C: \{0,1\}^k \to \{0,1\}^n$ denote a binary [n, k, 2t+1] linear error correcting code and $D: \{0,1\}^n \to \{0,1\}^k$ denote the decoding function of this code. Here, k is the size of the original block, n is the size of the encoded block, and t is the integer number of bit errors that the code can correct.

It is assumed that the Hamming distance between A and B is less than t. In this procedure, Alice publicly releases the syndrome of her data A, Syn(A), to Bob. Bob uses Syn(A) and his own string B to calculate A, in Eqn. 7.

$$A = B \oplus C(D(B \oplus \text{Syn}(A))) \quad (7)$$

The calculation in Eqn. 7 can be done in polynomial time if the error correcting code supports decoding and encoding in polynomial time. The syndrome of a [n, k, 2t+1] error correcting code is n−k bits long. So, this process gives away at most n−k bits of information about the secret string.

Typically, error correction codes need to calculate the redundant information (that is used in correcting errors) all at once. However, instead of using error correction codes, the present invention utilizes a protocol that works in an interactive fashion, where certain amount of information is revealed and used by both the parties. After this if it is found that there is a high probability of both bit streams still being different, some more information can be revealed. This step can be iterated until the probability of two bit streams being different falls below a certain threshold. For instance, one device (device A or B) permutes the bit stream randomly, divides it into small blocks and sends permutation and parity information of each block to the other device. The other device permutes its bit stream in the same way, divides it into small blocks, calculates and checks whether the parity of the blocks are same or not. For each block whose parity does not match, device B performs a binary search to find which bit in that block actually differs and thus reveals more parity information in the process. These steps are iterated multiple times until the probability of success becomes higher than the desired threshold. As a result, the present invention reveals less information than the error correcting code based approach.

Privacy Amplification

There are situations when the bit streams obtained from the channel measurements have redundant bits. First, when the channel is sampled at a rate that is higher than the rate at which the channel changes with time, the channel measurements can be time-correlated. Second, in the information reconciliation stage the redundant information is given out (either in the form of a syndrome of a linear code or the parity bits of different blocks of data) to make bit streams at device A and B exactly the same. An adversary Eve may be able to use this correlated/redundant information to guess some portions of the extracted key unless portions of the bit stream are removed in a way that makes the revealed information useless to the adversary.

Specifically, strong randomness extractors are used to extract purely random bits from the reconciled bits. Strong extractors can extract at most $(n_0 - 2 \log(1/\epsilon) + O(1))$ if nearly random bits, where $n_0$ is the entropy in bits of the bit stream input to the algorithm, and $\epsilon$ is the error limit. Constructions of strong extractors are often complex as they tend to achieve high efficiency by minimizing the length of initial seed. However, the length of the seed is of less importance than maximizing the amount of randomness that can be extracted.

In one embodiment, hash functions drawn at random from a 2-universal family of hash functions can be used to achieve extraction of optimal $n_0 - 2 \log(1/\epsilon)$ bits. For instance, the leftover hash-lemma function can be used. Let K be a set of keys, V be a set of values and H be a family of hash functions mapping K to V. The functions in set H can be indexed by S in a set "S". Typically, S is referred to as the random seed and set "S" is the set of possible seeds. The set H is called a 2-universal family of hash functions if for all pairs of distinct keys x and y in K the condition in Eqn. 8 holds.

$$P_{S \in S}[h_S(x)=h_S(y)] \leq 1/|V| \qquad (8)$$

In Eqn. 8, P denotes the probability operator, $h_S()$ is function in H indexed by S, and $|V|$ denotes the size of V. The leftover hash-lemma states that if X is a random variable over $\{0,1\}^n$, m>0 and h: $S \times \{0,1\}^n \to \{0,1\}^m$ is a 2-universal hash function, and if $$m \leq H_\infty(X) - 2 \log(1/\epsilon), \qquad (9)$$

where $H_\infty(X)$ denotes the Renyi entropy of X, then for S taken to be a uniform random variable over set "S" and independent of X, $$\delta((h_S(X),S),(U,S)) \leq \epsilon, \qquad (10)$$

where U is uniform over $\{0,1\}^m$ and independent of S, $\epsilon$ is the error limit, and $\delta(X, Y)$ is the statistical distance between X and Y defined in Eqn. 11.

$$\delta(X, Y) = \frac{1}{2}\sum_v \left| Pr[X = v] - Pr[Y = v] \right| \qquad (11)$$

In other words any 2-universal family of hash function can be used to extract $H_\infty(X) - 2 \log(1/\epsilon)$ random bits out of any random variable X.

For instance, a 2-universal hash family consisting of all the functions $h_{a,b}: \{1 \ldots M\} \to \{0,1\}^m$ can be used of the form in Eqns. 12 and 13:

$$g_{a,b}(x)=(ax+b) \bmod p_M \qquad (12)$$

$$h_{a,b}(x)=g_{a,b}(x) \bmod m \qquad (13)$$

where for every $a \in \{1, \ldots, p_M-1\}$ and $b \in \{0, \ldots, p_M-1\}$, $p_M$ is a prime number and $p_M > M$.

Secret Bit Rate Estimation

Let us assume that the bit streams produced by measuring the channel have a minimum entropy of $n_0$ bits. Let p denote the probability of a bit having different values in the bit stream for device A and the bit stream for device B. In addition, let T denote the time (in seconds) taken by device A and B to extract these bit streams by taking channel measurements. As mentioned earlier, information theoretic limit on the amount of information, which needs to be communicated between device A and B to make their bit stream identical, is $n_0(p \log(p)+(1-p)\log(1-p))$. Let $\epsilon$ denote the error limit on the statistical difference between the final derived key using the privacy amplification stage and the uniform distribution. As such, in the privacy amplification stage, $n_0(p \log(p)+(1-p)\log(1-p))+2 \log(1/\epsilon)$ bits need to be removed. In other words, after the privacy amplification stage, a secret key of length $n_0-n_0(p \log(p)+(1-p)\log(1-p))-2 \log(1/\epsilon)$ is generated. Therefore, the key generation rate is expressed in Eqn 14.

$$r = \frac{n_0 - n_0(p\log(p) + (1-p)\log(1-p)) - 2\log(1/\epsilon)}{T} \qquad (14)$$

Device Mobility

At any moment in time, when a channel is sampled to determine a temporal link signature the size of the secret space may be limited to a certain bit length. For instance, the effective shared secret bit space may be between 10-50 bits in length. In one embodiment, to increase the length of a shared secret, multiple independent measurements are obtained of the temporal key signatures between device A and B. These multiple temporal key signatures are combined to produce a larger shared secret. For example, consider obtaining 20 measurements of independent temporal link signatures, such that device A or B from FIG. 1 move, relative to each other, in a random manner.

In one embodiment, the random movement occurs over a space exceeding one meter. That is, the random movement can be broken down into steps that are bigger than one meter. In other embodiments, the random movements can be broken down into steps that are less than one meter (e.g., 10 cms), such that the total space in which the random movement is generated occurs approximately within a one square meter space. With smaller random movements, the two bit streams at device A and B may not be as well correlated. This may require longer or additional steps to align the two bit streams at device A and B to create a sufficiently long digital secret.

For example, a shared secret may include twenty independent measurements in the order they were measured. As such, the size of the shared secret is increased by bits equivalent to twenty factorial (20!). An attacker will have to try 20! permutations to break the shared secret, in the worst case. The 20! permutations corresponds to about sixty-one (61) bits, which is in addition to the normal shared secret space. For a secret space of approximately twenty-five (25) bits, the random movement increases the size of the shared secret to approximately eighty-five (85) bits.

In addition, the size can be increased by introducing more independent measurements. For instance, forty (40) independent measurements at random locations will increase the shared secret space size by about one-hundred sixty (160) bits.

Multiple-Input-Multiple Output Radio Channels

We propose to explore the use of multiple-input multiple-output (MIMO) radio channels to dramatically expand the quantity of link information that can be used as a shared secret. Generally, narrowband MIMO channels are represented as a complex-valued transfer matrix, H, such that the received signal vector y can be represented as a linear combination of the transmitted signal x, that is, y=H x. Each element of the vector x is the complex signal amplitude sent from one of the N transmit antennas, and each element of y is the complex signal amplitude received at one of the M antennas. The N×M elements of matrix H are random variables, with correlation depending on the spacing of the antennas. In addition, MIMO systems typically use measurements at multiple frequencies. In total, a large quantity of multipath channel information is measured using the H matrices. Interestingly, this can be done without any overheads because MIMO radios must estimate H. These MIMO measurements can be used to determine a shared secret.

In particular, each pair of transmitters is capable of generating a shared secret key between the two devices. As such, a combination of digital secrets can be combined to form a larger digital secret, or secret key that is shared between the two devices fro purposes of secure communication. The multiple pairs of transmitters/receivers provide for the generation of the secret key over a shorter period of time. In one embodiment, the spacing between the transmitters/receivers at single device is separated by at least one-half wavelength of the transmitted signal (e.g., 6 cms.).

Shared Secret Generation

Figure 5A:
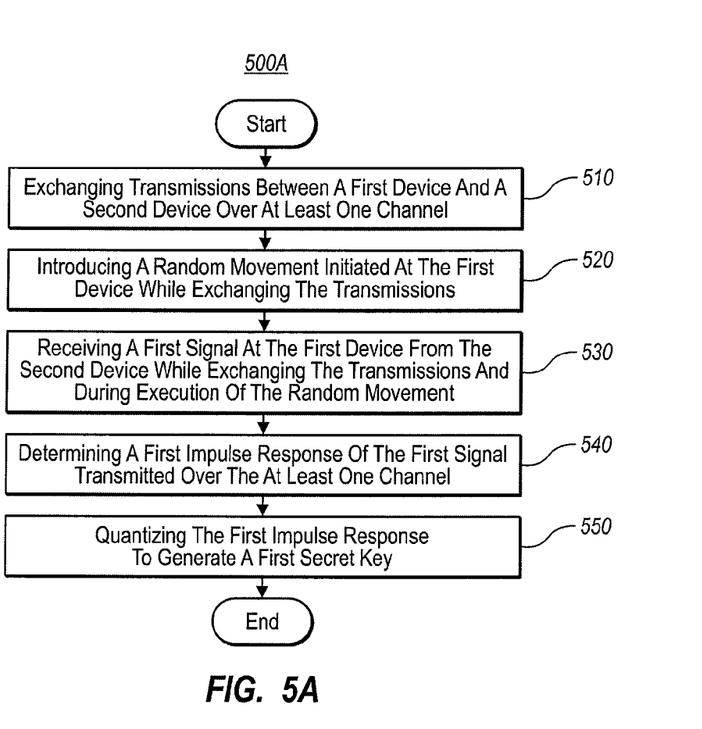
FIG. 5A is a flow chart of a method for digital secret generation, in accordance with one embodiment of the present invention.
Figure 5B:
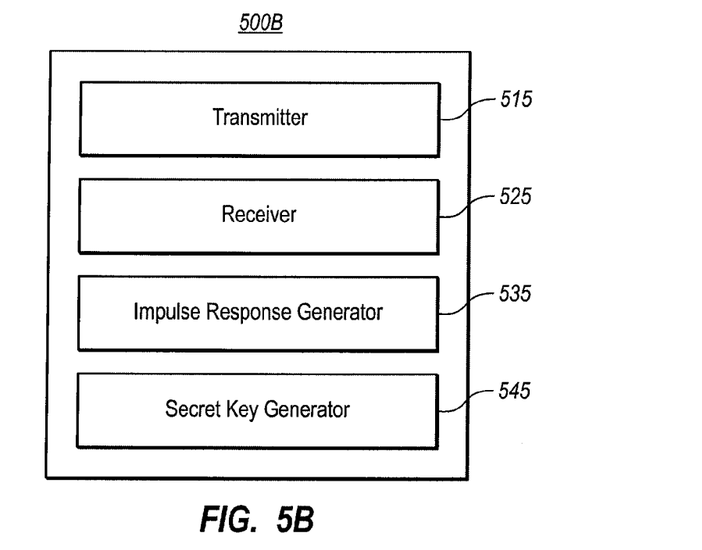
FIG. 5B is a block diagram of a system capable of generating a digital secret, in accordance with one embodiment of the present invention.

FIG. 5 is a flow chart 500 illustrating steps in a method for shared secret generation between two wireless devices, in accordance with one embodiment of the present invention. The method is performed in part by components found in devices A and B of FIG. 2.

At 510, transmissions are exchanged between a first device and a second device over at least one channel. For instance, transmissions are exchanged between device A and device B of FIG. 2. One or more channels may be defined between devices A and B since the transmissions occur over an extended period for data collection. As an example, the period for data collection may range from less than one second to more than thirty seconds.

At 520, a random movement is initiated at the first device. The random movement is executed while exchanging the transmissions. That is, the random movement is executed during the time when the transmissions are exchanged between devices A and B for purposes of generation of a digital secret.

More particularly, a relative movement between the two devices A and B is performed. The relative movement may include movement of the first device or second device, or movement by both the first and second devices. As discussed previously, the random movement increases the length of the bit sequence over a channel at any moment in time. This reduces the amount of time for generating a sufficiently long digital secret (e.g., 256 bits in length).

In addition, the random movement defines the one or more channels between devices A and B that are present during the transmissions. This random movement is difficult, if not impossible to recreate, even if an adversary is able to perform the same process in FIG. 5 for generating a digital secret. First, the environment between the two devices would change from the time the digital secret is exchanged and generated at devices A and B. Second, the relative random movement between devices A and B is impossible to reproduce. As such, the channel characteristics between devices A and B that existed upon the generation of the digital secret would could not be recreated by an adversary. This preserves the integrity of the digital secret generated between devices A and B.

In one embodiment, the random movement is performed by the user. The random movement is performed either with the entire device, or with critical elements of the device. For instance, the transmitter or receiver is subjected to the random movement. A prompt may be presented to the user to perform the random movement. In addition, the collection of transmissions is performed while movement of the device is detected. In another embodiment, the random movement is performed automatically.

The operations performed at 530, 540, and 550 have been discussed at length in the description of bit extraction. In particular, at 530, a first signal is received at the first device from the second device during the exchange of transmissions and the performance of the random movement. In generation of the digital secret, this process is performed at both devices. In this manner, the digital secret is generated at both ends of the channel, taking advantage of the reciprocal characteristics of the one or more channels between the two devices. The received signals need not be simultaneously transmitted and received at both devices, in one embodiment. In another embodiment, the received signals are transmitted and received at both devices simultaneously. The discussion following is directed at one of the two devices, but is equally applicable for the other device in the generation of the digital secret.

At 540, an impulse response is determined from the received signal over the one or more channels. The impulse response is the RSS data $\{r_{a,i}\}$, in one embodiment. In addition, filtering, quantization, and forming censored index set T operations are performed on the RSS data $\{r_{a,i}\}$.

For example, the first device filters the data stream $\{r_{a,i}\}$. The filter $F(z)=F_1(z)F_2(z)$ is a concatenation of two filters: (i) a bandpass filter $F_1(z)$ which both removes the running mean, and (ii) a low pass filter $F_2(z)$. The low pass filter addresses the case where very high frequencies changes in $\{r_{a,i}\}$ can be non-reciprocal in nature. The running mean RSS value is correlated with the path length. Since an attacker could know the path length, that information should not be used in the secret. Furthermore, the average measured RSS is highly non-reciprocal because the gains and losses in components of the transmitter and receiver often vary between devices because of manufacturing variations. The filter $F_1(z)$ subtracts the average of the previous $k_1$ samples, as shown in Eqn. 15.

$$F_1(z) = 1 - \frac{1}{k_1}\sum_{m=1}^{k_1} z^{-m} \qquad (15)$$

At 550, the impulse response is quantized to generate the digital secret, or the secret key that is shared between the two devices. As described previously, there are two thresholds, $[-\gamma, \gamma]$. Time indices i, form the set $T_a=\{i: -\gamma \leq x_{a,i} \leq {}^a\gamma\}$ which is sent to the other device. When the first device receives the reciprocal and corresponding set $T_b$ from the second device, it forms the union set $T=T_a \cup T_b$ and forms the vector $b_a$, as provided in Eqn 2.

In one implementation, the threshold $\gamma$ is adaptively set depending on the sample standard deviation of $\{x_{a,i}\}_i$. If $\gamma$ is set too high, the number of values that fall within the threshold will be very high and few bits will be available for use in the secret key. This also increases the amount of time needed to probe the channel since the threshold values with indices in T are removed from the final vector. In contrast, if $\gamma$ is set too low, the probability of bit disagreement will increase.

The process outlined in FIG. 5 can be repeated throughout the transmissions between devices A and B to obtain multiple digital secrets. These measurements of a digital secret occur at different times during the course of transmissions. Because of the random movement, these measurements are taken at different relative positions between devices A and B, and as such, the channel characteristics are different for each measurement. Combining the measurements can be described as a channel characteristic measurement sequence. The sequence is impacted by the relative motion between the devices. One or more digital secrets that are generated can be combined to form a longer digital secret or secret key that is used between devices A and B for secure communication.

A method and system for generating a digital secret between two devices is thus described. While the invention has been illustrated and described by means of specific embodiments, it is to be understood that numerous changes and modifications may be made therein without departing from the sprit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:
1. A method for generating a related pair of encryption keys at a first device and at a second device, the method comprising:

providing a first device configured to transmit and receive a radio signal over one or more channels, said first device being configured to calculate an impulse response based on a received radio signal, and further configured to quantize an impulse response;

providing a second device configured to transmit and receive a radio signal over said one or more channels, said second device being configured to calculate an impulse response based on a received radio signal, and further configured to quantize an impulse response;

causing said second device to send a first radio signal through said one or more channels to said first device;

receiving said first radio signal at said first device, said first received signal having a first temporal link signature;

causing said first device to calculate a first impulse response based on said first temporal link signature;

causing said first device to quantize said first impulse response to generate a first key for modification of radio signals;

causing said first device to send a second radio signal through said one or more channels to said second device;

receiving said second radio signal at said second device, said second received radio signal having a second temporal link signature;

causing said second device to calculate a second impulse response based on said second temporal link signature;

causing said second device to quantize said second impulse response to generate a second key substantially identical to said first key subsequent to a movement of said first device relative to said second device, causing said second device to send a third radio signal through a second one or more channels;

receiving said third radio signal at said first device, said third received radio signal having a third temporal link signature;

causing said first device to calculate a third impulse response based on said third temporal link signature;

causing said first device to quantize said third impulse response to generate a third key;

causing said first device to combine said first key and said third key to generate a fourth key for modification of radio signals;

subsequent to the movement of said first device relative to said second device, causing said first device to send a fourth radio signal through said second one or more radio channels;

receiving said fourth radio signal at said second device, said received radio signal having a fourth temporal link signature;

causing said second device to calculate a fourth impulse response based on said fourth temporal link signature;

causing said second device to quantize said fourth impulse response to generate a fifth key; and causing said second device to combine said second key and said fifth key to generate a sixth key substantially identical to said fourth key for modification of radio signals.

2. The method of claim 1 wherein said first key is identical to said second key.

3. The method of claim 1 wherein said fourth key is identical to said sixth key.

4. The method of claim 1, wherein said first device is further configured to filter noise out of said first impulse response, the method further comprising causing said first device to filer noise out of said first impulse response.

5. The method of claim 1, wherein said first key is comprised of a first series of bits, said second key is comprised of a second series of bits, and wherein said first device and said second device are configured to reconcile said first series of bits and said second series of bits, the method further comprising causing said first device and said second device to reconcile said first series of bits and said second series of bits.

6. A system for generating a related pair of keys, the system comprising:

a first device comprising:
   a first transmitter configured to transmit a first radio signal over one or more channels to a second device when said first device is in a first physical position relative to said second device, and to transmit a second radio signal over said one or more channels to said second device when said first device is in a second physical position relative to said second device after motion of one or both of said first device or said second device;
   a first receiver configured to receive a third radio signal over said one or more channels from said second device when said first device is in said first physical position relative to said second device, and to receive a fourth radio signal over said one or more channels from said second device when said first device is in said second physical position relative to said second device after said motion of one or both of said first device or said second device;
   a first impulse response generator configured to calculate a first impulse response based on said third radio signal and to calculate a second impulse response based on said fourth radio signal; and
   a first key generator configured to quantize said first impulse response and said second impulse response, and to generate a first key based on said first impulse response and said second impulse response for modification of radio signals; and said second device comprising:
   a second transmitter configured to transmit said third radio signal over said one or more channels to said first device when said first device is in said first physical position relative to said second device, and to transmit said fourth radio signal over said one or more channels to said first device when said first device is in said second physical position relative to said second device after said motion of one or both of said first device or said second device;
   a second receiver configured to receive said first radio signal over said one or more channels from said first device when said first device is in said first physical position relative to said second device, and to receive said second radio signal over said one or more channels from said first device when said first device is in said second physical position relative to said second device after said motion of one or both of said first device or said second device;
   a second impulse response generator configured to calculate a third impulse response based on said first radio signal and to calculate a fourth impulse response based on said second radio signal; and
   a second key generator configured to quantize said third impulse response and said fourth impulse response, and to generate a second key based on said third impulse response and said fourth impulse response for modification of radio signals, said second key substantially identical to said first key.

7. The system of claim 6, wherein said first device is further configured to filter noise out of said first impulse response and said second impulse response.

8. The system of claim 6, wherein said second device is further configured to filter noise out of said third impulse response and said fourth impulse response.

9. The system of claim 6, wherein said first key is a combination of a third key generated from said first impulse response and a fourth key generated from said second impulse response.

10. The system of claim 6, wherein said second key is a combination of a third key generated from said third impulse response and a fourth key generated from said fourth impulse response.

11. The method of claim 6, wherein said first key is comprised of a first series of bits, said second key is comprised of a second series of bits, and wherein said first device and said second device are configured to reconcile said first series of bits and said second series of bits.

12. A method, performed at a first device configured to transmit and receive a radio signal over one or more channels to a second device, said first device being configured to calculate an impulse response based on a received radio signal, and being further configured to quantize an impulse response, a method for generating keys for modification of radio signals, the method comprising:
when said first device and said second device are in a first physical position relative to one another, generating a first pair of substantially identical keys, including:
receiving a first radio signal from said second device, said first radio signal having a first temporal link signature;
calculating a first impulse response based on said first temporal link signature;
quantizing said first impulse response to generate a first key for modification of radio signals; and
sending a second radio signal to said second device, said second radio signal having a second temporal link signature, said second temporal link signature used by said second device to generate a second key for modification of radio signals that is substantially identical to said first key; and
when said first device and said second device are in a second physical position relative to one another after movement of one or both of said first device or said second device, generating a second pair of substantially identical keys and a third pair of substantially identical keys, including:
receiving a third radio signal from said second device, said third radio signal having a third temporal link signature;
calculating a third impulse response based on said third temporal link signature;
quantizing said third impulse response to generate a third key for modification of radio signals;
combining said first key and said third key to generate a fourth key for modification of radio signals; and
sending a fourth radio signal to said second device, said fourth radio signal having a fourth temporal link signature, said fourth temporal link signature used by said second device to generate a fifth key that is substantially identical to said third key and to combine said second key and said fourth key to generate a sixth key for modification of radio signals that is substantially identical to said fourth key.

13. The method of claim 12 wherein said first key is identical to said second key.

14. The method of claim 12 wherein said third key is identical to said fifth key.

15. The method of claim 12 wherein said fourth key is identical to said sixth key.

16. The method of claim 12, wherein said first device is further configured to filter noise out of said first impulse response, the method further comprising causing said first device to filer noise out of said first impulse response.

17. The method of claim 12, wherein said first key is comprised of a first series of bits, said second key is comprised of a second series of bits, and wherein said first device and said second device are configured to reconcile said first series of bits and said second series of bits, the method further comprising causing said first device and said second device to reconcile said first series of bits and said second series of bits.

* * * * *